United States Patent
Tsukamoto

(10) Patent No.: US 12,195,637 B2
(45) Date of Patent: Jan. 14, 2025

(54) CROSSLINKING AGENT FOR AQUEOUS RESIN, LIQUID CONTAINING CROSSLINKING AGENT FOR AQUEOUS RESIN, AND AQUEOUS-RESIN COMPOSITION

(71) Applicant: NISSHINBO CHEMICAL INC., Tokyo (JP)

(72) Inventor: Nami Tsukamoto, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 689 days.

(21) Appl. No.: 17/435,880

(22) PCT Filed: Mar. 4, 2020

(86) PCT No.: PCT/JP2020/009235
§ 371 (c)(1),
(2) Date: Sep. 2, 2021

(87) PCT Pub. No.: WO2020/179836
PCT Pub. Date: Sep. 10, 2020

(65) Prior Publication Data
US 2022/0145122 A1  May 12, 2022

(30) Foreign Application Priority Data
Mar. 5, 2019 (JP) ................. 2019-039957

(51) Int. Cl.
| | | |
|---|---|---|
| C09D 175/04 | (2006.01) | |
| C08G 18/02 | (2006.01) | |
| C08G 18/83 | (2006.01) | |
| C08L 33/08 | (2006.01) | |
| C08L 63/00 | (2006.01) | |
| C08L 67/00 | (2006.01) | |
| C08L 75/04 | (2006.01) | |
| C09D 5/00 | (2006.01) | |
| C09D 7/20 | (2018.01) | |
| D06M 15/564 | (2006.01) | |
| D06M 15/59 | (2006.01) | |

(52) U.S. Cl.
CPC ......... *C09D 175/04* (2013.01); *C08G 18/025* (2013.01); *C08G 18/831* (2013.01); *C08G 18/833* (2013.01); *C08L 33/08* (2013.01); *C08L 63/00* (2013.01); *C08L 67/00* (2013.01); *C08L 75/04* (2013.01); *C09D 5/00* (2013.01); *C09D 7/20* (2018.01); *D06M 15/564* (2013.01); *D06M 15/59* (2013.01)

(58) Field of Classification Search
CPC ......... C09D 175/04; C09D 5/00; C09D 7/20; C09D 7/65; C09D 7/63; C09D 201/00; C08G 18/025; C08G 18/831; C08G 18/833; C08G 18/758; C08G 18/797; C08G 18/095; C08L 33/08; C08L 63/00; C08L 67/00; C08L 75/04; C08L 75/00; D06M 15/564; D06M 15/59; C08K 5/29; C08K 5/0025; C09J 201/00
See application file for complete search history.

(56) References Cited

U.S. PATENT DOCUMENTS

| | | | |
|---|---|---|---|
| 5,856,014 A | 1/1999 | Imashiro et al. | |
| 2018/0371237 A1* | 12/2018 | Tsukamoto | ............ C08G 18/09 |
| 2020/0048467 A1 | 2/2020 | Yamashita et al. | |

FOREIGN PATENT DOCUMENTS

| | | | |
|---|---|---|---|
| EP | 2 518 113 A1 | 10/2012 | |
| JP | 59-193916 A | 11/1984 | |
| JP | 9-235508 A | 9/1997 | |
| TW | 201840618 A | 11/2018 | |
| WO | WO-2017006950 A1 * | 1/2017 | ........... C08G 18/025 |

OTHER PUBLICATIONS

Extended European Search Report for European Application No. 20765511.9 dated Nov. 28, 2022.
International Search Report, issued in PCT/JP2020/009235, PCT/ISA/210, dated May 19, 2020.
Chinese Office Action and Search Report for Chinese Application No. 202080018111.9, dated Dec. 22, 2021.

* cited by examiner

*Primary Examiner* — Andrew J. Oyer
*Assistant Examiner* — Cullen L G Davidson
(74) *Attorney, Agent, or Firm* — Birch, Stewart, Kolasch & Birch, LLP

(57) ABSTRACT

Provided is a carbodiimide-based, waterborne resin crosslinking agent that can improve the storage stability of a waterborne resin composition including a waterborne resin together with the crosslinking agent and further also improve the water resistance and the solvent resistance of a cured product of the waterborne resin. A waterborne resin crosslinking agent-containing liquid and a waterborne resin composition are prepared using a waterborne resin crosslinking agent comprising a hydrophobic polycarbodiimide compound and a water-soluble organic compound as blending components, wherein the water-soluble organic compound is one or more selected from the group consisting of an alkylene glycol-based compound, a water-soluble polymer other than the alkylene glycol-based compound, and a surfactant other than the alkylene glycol-based compound or the water-soluble polymer.

17 Claims, No Drawings

CROSSLINKING AGENT FOR AQUEOUS RESIN, LIQUID CONTAINING CROSSLINKING AGENT FOR AQUEOUS RESIN, AND AQUEOUS-RESIN COMPOSITION

TECHNICAL FIELD

The present invention relates to a carbodiimide-based waterborne resin crosslinking agent, and a waterborne resin crosslinking agent-containing liquid and a waterborne resin composition comprising the same.

BACKGROUND ART

A waterborne resin, which has water solubility or water dispersibility, is excellent in handleability in terms of the environment and safety, and thus is used in various applications such as a paint, an ink, a fiber treatment agent, an adhesive, and a coating agent. In the waterborne resin, a hydrophilic group such as a hydroxyl group or a carboxy group is introduced in order to impart water solubility or water dispersibility to the resin itself. Therefore, the waterborne resin tends to be inferior in water resistance and durability to an oil resin.

Because of this, in order to improve various physical properties such as water resistance, durability, and strength of the waterborne resin, a crosslinking agent is added to the waterborne resin.

As an example of such a crosslinking agent, a polycarbodiimide compound is known. In order to cause the polycarbodiimide compound to act effectively as a crosslinking agent, it is desirable for the polycarbodiimide compound to be also uniformly dispersed in water.

As a method for dispersing a polycarbodiimide compound in water, for example, PTL1 discloses use of a polycarbodiimide compound having a hydrophilic group at a terminal, which is end-capped with polyethylene glycol or the like.

In addition, PTL2 discloses that in Example 11, a solution prepared by dissolving a polycarbodiimide compound in amylacetate is emulsified in water using a sodium salt of dialkylsulfosuccinate.

CITATION LIST

Patent Literature

PTL1: WO 2017/006950
PTL2: JP Laid-Open No. 59-193916

SUMMARY OF INVENTION

Technical Problem

However, when a polycarbodiimide compound having a hydrophilic group at a terminal as disclosed in PTL1 is dispersed in water including a waterborne resin, a carbodiimide group is present at the interface between the water and the waterborne resin and thus provides easy reaction with water. Because of this, a waterborne resin composition including water has a short pot life and it cannot be deemed that it has sufficient storage stability.

The emulsion obtained by the method disclosed in PTL2 includes as much as about 30% by mass of amyl acetate, which is an organic solvent, and it cannot be deemed that the emulsion has sufficient storage stability; and in addition, the inclusion of a large amount of an organic solvent impairs the dissolution of the waterborne resin itself and the advantages of the waterborne resin in terms of environmental and safety handling.

The present invention has been made to solve the above problems, and an object of the present invention is to provide a carbodiimide-based, waterborne resin crosslinking agent that can improve the storage stability of a waterborne resin composition including a waterborne resin together with the crosslinking agent and further also improve the water resistance and the solvent resistance of a cured product of the waterborne resin.

In addition, another object of the present invention is to provide a waterborne resin crosslinking agent-containing liquid having excellent handleability and a waterborne resin composition that use the waterborne resin crosslinking agent.

Solution to Problem

The present invention is based on the finding that in a carbodiimide-based, waterborne resin crosslinking agent, the storage stability of a waterborne resin composition including a waterborne resin and the waterborne resin crosslinking agent can be improved by using a predetermined water-soluble organic compound in combination.

Specifically, the present invention provides the following [1] to [17].

[1] A waterborne resin crosslinking agent comprising a polycarbodiimide compound and a water-soluble organic compound as blending components, wherein the polycarbodiimide compound is a hydrophobic polycarbodiimide compound, and the water-soluble organic compound is one or more selected from the group consisting of an alkylene glycol-based compound, a water-soluble polymer other than the alkylene glycol-based compound, and a surfactant other than the alkylene glycol-based compound or the water-soluble polymer.

[2] The waterborne resin crosslinking agent according to the above [1], wherein a total amount of the water-soluble organic compound blended is 0.05 to 60.0 parts by mass per 100 parts by mass of the hydrophobic polycarbodiimide compound.

[3] The waterborne resin crosslinking agent according to the above [1] or [2], wherein the hydrophobic polycarbodiimide compound has a structure in which all terminal isocyanate groups are capped with an end-capping compound, and the end-capping compound has one amino group, isocyanate group, epoxy group, carboxy group, or hydroxyl group independently at each of the terminals.

[4] The waterborne resin crosslinking agent according to any one of the above [1] to [3], wherein the alkylene glycol-based compound is one or more selected from the group consisting of an ethylene glycol-based compound and a propylene glycol-based compound.

[5] The waterborne resin crosslinking agent according to any one of the above [1] to [4], wherein the alkylene glycol-based compound is a compound represented by the following formula (1):

$$R^2(OCHR^1CH_2)_nOR^3 \qquad (1)$$

wherein $R^1$ is a hydrogen atom or a methyl group; $R^2$ and $R^3$ are each independently a hydrogen atom, a hydrocarbon group having 1 to 18 carbon atoms, or an acyl group having 2 to 18 carbon atoms; and n is an integer of 1 to 70.

[6] The waterborne resin crosslinking agent according to the above [5], wherein in the formula (1), $R^2$ and $R^3$ are each independently a hydrogen atom or an alkyl group having 1 to 3 carbon atoms.

[7] The waterborne resin crosslinking agent according to any one of the above [1] to [6], wherein the water-soluble polymer is one or more selected from the group consisting of polyvinylpyrrolidone, polyvinyl alcohol, polyethyleneimine, polyacrylic acid, polyacrylamide, carboxymethylcellulose, starch, and gelatin.

[8] The waterborne resin crosslinking agent according to any one of the above [1] to [7], wherein the surfactant is one or more selected from the group consisting of alkylbenzene sulfonate, benzalkonium chloride, and polyoxyethylene sorbitol tetraoleate.

[9] A waterborne resin crosslinking agent-containing liquid comprising the waterborne resin crosslinking agent according to any one of the above [1] to [8] and an aqueous medium.

[10] The waterborne resin crosslinking agent-containing liquid according to the above [9], wherein the aqueous medium is water or a mixed solvent of water and a hydrophilic solvent.

[11] A waterborne resin composition comprising the waterborne resin crosslinking agent according to any one of the above [1] to [8] and a waterborne resin.

[12] The waterborne resin composition according to the above [11], wherein the waterborne resin has a group selected from the group consisting of a carboxy group, an amino group, and a hydroxyl group.

[13] The waterborne resin composition according to the above [11] or [12], wherein the waterborne resin is one or more selected from the group consisting of a polyester resin, an acrylic resin, a polyurethane resin, an epoxy resin, a styrene-acrylic resin, a melamine resin, a polyolefin resin, and a fluororesin.

[14] The waterborne resin composition according to any one of the above [11] to [13], wherein the waterborne resin composition is used for an adhesive, a fiber treatment agent, a coating agent, or a paint.

[15] The waterborne resin composition according to the above [14], wherein the paint is for wet-on-wet coating.

[16] A resin film formed from the waterborne resin composition according to any one of the above [11] to [15].

[17] An article obtained by forming the resin film according to the above [16] on a base material.

Advantageous Effects of Invention

The waterborne resin crosslinking agent of the present invention can improve the storage stability of a waterborne resin composition including a waterborne resin together with the waterborne resin crosslinking agent. Further, the water resistance and the solvent resistance of a cured product of the waterborne resin can also be improved by using the waterborne resin crosslinking agent. Therefore, the waterborne resin composition including the waterborne resin crosslinking agent can be preferably used for applications such as an adhesive, a fiber treatment agent, a coating agent, and a paint.

In addition, the waterborne resin crosslinking agent-containing liquid using the waterborne resin crosslinking agent is excellent in handleability when a crosslinking agent is used for crosslinking a waterborne resin.

DESCRIPTION OF EMBODIMENTS

Hereinafter, the waterborne resin crosslinking agent, and the waterborne resin crosslinking agent-containing liquid and the waterborne resin composition comprising the same according to the present invention will be described in detail.

"Waterborne" as used in the present invention means having solubility or dispersibility in an aqueous medium. The "aqueous medium" refers to water and/or a hydrophilic solvent. The "polycarbodiimide compound" refers to a compound having two or more carbodiimide groups.

[Waterborne Resin Crosslinking Agent]

The waterborne resin crosslinking agent of the present invention (hereinafter, also simply referred to as the "crosslinking agent") includes a polycarbodiimide compound and a water-soluble organic compound as blending components. The polycarbodiimide compound blended in the crosslinking agent is a hydrophobic polycarbodiimide compound. The water-soluble organic compound is one or more selected from the group consisting of an alkylene glycol-based compound, a water-soluble polymer other than the alkylene glycol-based compound, and a surfactant other than the alkylene glycol-based compound or the water-soluble polymer.

According to such a crosslinking agent, the storage stability of a waterborne resin composition including a waterborne resin together with the crosslinking agent can be improved as compared with the conventional carbodiimide-based, waterborne resin crosslinking agent.

It is generally considered that the water-soluble organic compound tends to reduce the water resistance and the solvent resistance of a cured product of the waterborne resin. However, by the water-soluble organic compound included together with the hydrophobic polycarbodiimide compound in the waterborne resin composition, the following unexpected effect was found: the water resistance and the solvent resistance of a cured product of the waterborne resin are improved. The present invention is based on this finding.

(Polycarbodiimide Compound)

The polycarbodiimide compound blended in the crosslinking agent of the present invention is a hydrophobic polycarbodiimide compound. The hydrophobic polycarbodiimide compound may be only one, or two or more thereof may be used in combination.

"Hydrophobic" as used here means not having ability in self-dispersion or self-emulsification in water.

The crosslinking agent of the present invention is configured to provide good dispersibility of a hydrophobic polycarbodiimide compound in an aqueous medium by using it in combination with the water-soluble organic compound without blending a hydrophilic polycarbodiimide compound.

In addition, blending the hydrophobic polycarbodiimide compound into the waterborne resin crosslinking agent can provide superior crosslinking performance at the time of curing of the waterborne resin composition, and also improves the storage stability when the waterborne resin composition is prepared.

On the other hand, a non-hydrophobic polycarbodiimide compound, that is, a hydrophilic polycarbodiimide compound has excellent affinity for an aqueous medium. However, upon contact with water or the like, this causes the reaction between a carbodiimide group and a reactive group in water or the waterborne resin to proceed, leading to insufficient exhibition of crosslinking performance by the carbodiimide group, and the hydrophilic polycarbodiimide compound is also inferior in storage stability to the hydrophobic polycarbodiimide compound.

The hydrophobic polycarbodiimide compound preferably has a structure in which all terminal isocyanate groups are capped with an end-capping compound. The end-capping compound is preferably a compound having one amino group, isocyanate group, epoxy group, carboxy group, or hydroxyl group independently at each of both the terminals.

The end-capping compound may be a hydrophobic compound or a hydrophilic compound as long as the capped polycarbodiimide compound is hydrophobic. The end-capping compound preferably has a molecular weight of less than 340 in view of reactivity for capping the terminal isocyanate groups, performance of the crosslinking agent obtained, and the like.

Examples of the compound having one amino group as the end-capping compound include monoamines having a hydrocarbon group having 1 to 18 carbon atoms. Specific examples thereof include methylamine, ethylamine, propylamine, butylamine, pentylamine, hexylamine, octylamine, dodecylamine, diethylamine, dipropylamine, dibutylamine, cyclohexylamine, adamantanamine, allylamine, aniline, diphenylamine, 3-aminopropyltrimethoxysilane, 3-aminopropyltriethoxysilane, N-phenyl-3-aminopropyltrimethoxysilane, 2,2-difluoroamine, fluorobenzylamine, trifluoroethylamine, [[4-(trifluoromethyl)cyclohexyl]methyl]amine, and derivatives thereof. Of these, cyclohexylamine and the like are preferably used in view of versatility and the like. These may be used singly or in combinations of two or more.

When capped with such a capping compound, a urea bond is formed by reaction of the isocyanate group with an amino group, and the isocyanate group is thus capped.

Examples of the compound having one isocyanate group as the end-capping compound include monoisocyanates having a hydrocarbon group having 1 to 18 carbon atoms. These may be used singly or in combinations of two or more.

When capped with such a compound, a carbodiimide bond (carbodiimide group) is formed by reaction of the isocyanate group with another isocyanate group, and the isocyanate group is thus capped.

Specific examples thereof include butyl isocyanate, pentyl isocyanate, hexyl isocyanate, octyl isocyanate, dodecyl isocyanate, cyclohexyl isocyanate, 1-adamantyl isocyanate, 3-isocyanate propyltriethoxysilane, 2-isocyanatoethyl acrylate, benzyl isocyanate, 2-phenylethyl isocyanate, and derivatives thereof. Of these, cyclohexyl isocyanate and the like are preferably used in view of reactivity and the like.

Examples of the compound having one epoxy group as the end-capping compound include monoepoxy compounds such as 1,2-epoxy heptane, 1,2-epoxy hexane, 1,2-epoxy decane, 1,2-epoxy-5-hexene, ethyl glycidyl ether, 2-ethylhexyl glycidyl ether, glycidyl lauryl ether, allyl glycidyl ether, diethoxy(3-glycidyloxypropyl)methylsilane, 3-[2-(perfluorohexyl)ethoxy]-1,2-epoxypropane, and derivatives thereof. These may be used singly or in combinations of two or more.

When capped with such a compound, an oxazolidone ring is formed by reaction of the isocyanate group with an epoxy group, and the isocyanate group is thus capped.

Examples of the compound having a carboxy group as the end-capping compound include monocarboxylic acids having a hydrocarbon group having 1 to 18 carbon atoms. These may be used singly or in combinations of two or more.

When capped with such a compound, an amide bond is formed by reaction of the isocyanate group with a carboxy group, and the isocyanate group is thus capped.

Specific examples thereof include acetic acid, propionic acid, butanoic acid, pentanoic acid, hexanoic acid, heptanoic acid, octanoic acid, nonanoic acid, decanoic acid, cyclohexanecarboxylic acid, adamantaneacetic acid, phenylacetic acid, benzoic acid, undecenoic acid, and derivatives thereof.

Examples of the compound having one hydroxyl group as the end-capping compound include monoalcohols having a hydrocarbon group having 1 to 18 carbon atoms. These may be used singly or in combinations of two or more.

When capped with such a compound, a urethane bond is formed by reaction of the isocyanate group with a hydroxyl group, and the isocyanate group is thus capped.

Specific examples thereof include cyclohexanol, oleyl alcohol, benzyl alcohol, dodecyl alcohol, octanol, hexanol, pentanol, butanol, propanol, and ethanol. Of these, n-octanol, isopropanol, oleyl alcohol, benzyl alcohol, and the like are preferably used in view of reactivity, versatility, and the like.

The compounds described above are preferable as the monoalcohols in view of water resistance of a cured product of the waterborne resin. For example, alkylene glycol monoethers and alkylene glycol monoesters, which are alkylene glycol derivatives, may also be used, and preferable examples thereof include a compound represented by the following formula (2).

$$R^5(OCHR^4CH_2)_mOH \qquad (2)$$

In the formula (2), $R^4$ is preferably a hydrogen atom or a methyl group.

$R^5$ is preferably a hydrocarbon group having 1 to 18 carbon atoms or an acyl group having 2 to 18 carbon atoms. The hydrocarbon group is more preferably a hydrocarbon group having 1 to 7 carbon atoms, and further preferably an alkyl group having 1 to 4 carbon atoms. The acyl group has more preferably 1 to 7 carbon atoms, and further preferably 1 to 4 carbon atoms.

m is preferably an integer of 1 to 6, more preferably an integer of 1 to 5, and further preferably an integer of 1 to 4.

Specific examples thereof include ethylene glycol monomethyl ether, diethylene glycol monomethyl ether, ethylene glycol monoethyl ether, ethylene glycol isopropyl ether, diethylene glycol monoisopropyl ether, ethylene glycol monobutyl ether, ethylene glycol monoisobutyl ether, ethylene glycol monohexyl ether, ethylene glycol mono 2-ethylhexyl ether, ethylene glycol monoallyl ether, ethylene glycol monophenyl ether, ethylene glycol monobenzyl ether, propylene glycol monomethyl ether, dipropylene glycol monomethyl ether, dipropylene glycol monopropyl ether, propylene glycol mono n-butyl ether, and polymers thereof polyethylene glycol glyceryl ether, polypropylene glycol glyceryl ether, and polypropylene glycol diglyceryl ether.

The hydrophobic polycarbodiimide compound can obtained by a known production method. For example, an isocyanate-terminated polycarbodiimide compound having two terminal isocyanate groups is synthesized by decarbonation condensation reaction of a diisocyanate compound having two isocyanate groups, and thereafter or at the same time, a predetermined end-capping compound is allowed to react therewith to cap the terminal isocyanate groups. Alternatively or additionally to the diisocyanate compound, a compound having three or more isocyanate groups can be used as a starting material for the reaction.

The diisocyanate compound is not particularly limited, and may be any of a chain or alicyclic aliphatic diisocyanate, an aromatic diisocyanate, or a heterocyclic diisocyanate, and these may be used singly or in combinations of two or more.

Examples of the chain aliphatic diisocyanate include tetramethylene diisocyanate, hexamethylene diisocyanate, dodecamethylene diisocyanate, and 2,2,4-trimethylhexamethylene diisocyanate.

Examples of the alicyclic diisocyanate include 1,3-bis(isocyanatomethyl)cyclohexane, 1,4-bis(isocyanatomethyl)

cyclohexane, 2,2-bis(4-isocyanatocyclohexyl)propane, isophorone diisocyanate, and dicyclohexylmethane-4,4'-diisocyanate.

Examples of the aromatic diisocyanate include toluene-2,4-diisocyanate, diphenylmethane-2,2'-diisocyanate, diphenylmethane-2,4'-diisocyanate, diphenylmethane-4,4'-diisocyanate, and 2,4,6-triisopropylbenzene-1,3-diyl diisocyanate.

Examples of the aliphatic diisocyanate including an aromatic ring include xylylene diisocyanate and 1,3-bis(2-isocyanato-2-propyl)benzene (common name: tetramethylxylylene diisocyanate).

Of these, in view of availability, easiness of synthesizing the hydrophobic polycarbodiimide compound, and the like, dicyclohexylmethane-4,4'-diisocyanate, isophorone diisocyanate, m-xylylene diisocyanate, and hexamethylene diisocyanate are preferable, and in particular, dicyclohexylmethane-4,4'-diisocyanate is preferably used.

The decarboxylation condensation reaction of the diisocyanate compound is preferably carried out in the presence of a carbodiimidization catalyst. Examples of the carbodiimidization catalyst include phosphorene oxides such as 1-phenyl-2-phosphorene-1-oxide, 3-methyl-1-phenyl-2-phosphorene-1-oxide, 1-ethyl-2-phosphorene-1-oxide, 3-methyl-2-phosphorene-1-oxide, and 3-phosphorene isomers thereof. Of these, 3-methyl-1-phenyl-2-phosphorene-1-oxide is preferable in view of reactivity.

The amount of the carbodiimidization catalyst used is usually preferably 0.01 to 2.0 parts by mass per 100 parts by mass of the diisocyanate compound.

The decarboxylation condensation reaction of the diisocyanate compound can be carried out in a solvent or in the absence of a solvent. Examples of the solvent used include an alicyclic ether such as tetrahydrofuran, 1,3-dioxane, or dioxolane; an aromatic hydrocarbon such as benzene, toluene, xylene, or ethylbenzene; a halogenated hydrocarbon such as chlorobenzene, dichlorobenzene, trichlorobenzene, Perclene, trichloroethane, or dichloroethane; cyclohexanone; propylene glycol monomethyl ether acetate, and diethylene glycol diethyl ether. These may be used singly or in combinations of two or more.

When the reaction is carried out in a solvent, the concentration of the diisocyanate compound is preferably 5 to 55% by mass, and more preferably 5 to 20% by mass.

The reaction temperature of the decarboxylation condensation reaction is preferably 40 to 250° C., and more preferably 80 to 195° C. When the reaction is carried out in a solvent, the temperature is preferably in the range of 40° C. to the boiling point of the solvent.

The reaction time is preferably 0.5 to 80 hours, and more preferably 1 to 70 hours.

The reaction is preferably carried out in an atmosphere of an inert gas such as nitrogen gas or a noble gas.

When the end-capping compound is an isocyanate compound, the hydrophobic polycarbodiimide compound is preferably obtained by stirring and mixing the diisocyanate compound and the end-capping compound at preferably 40 to 200° C. and more preferably 80 to 195° C. for about 10 to 70 hours in the presence of a carbodiimidization catalyst.

When the end-capping compound is other than an isocyanate compound, the hydrophobic polycarbodiimide compound is preferably obtained by adding the end-capping compound to isocyanate-terminated polycarbodiimide at preferably 40 to 250° C. and more preferably 80 to 195° C. and further stirring and mixing these at about 80 to 200° C. for about 0.5 to 5 hours.

The degree of polymerization of the hydrophobic polycarbodiimide compound (degree of polymerization of the carbodiimide group) is not particularly limited, and is preferably 1 to 30, more preferably 2 to 25, and further preferably 3 to 20, in view of preventing gelation of the hydrophobic polycarbodiimide compound in an aqueous medium.

The "degree of polymerization of the carbodiimide group" as used herein refers to the number of carbodiimide groups produced by the decarboxylation condensation reaction between diisocyanate compounds in the polycarbodiimide compound.

(Water-Soluble Organic Compound)

As the water-soluble organic compound, an alkylene glycol-based compound, a water-soluble polymer other than the alkylene glycol-based compound, or a surfactant other than the alkylene glycol-based compound or the water-soluble polymer is used. These water-soluble organic compounds may be used singly or in combinations of two or more.

The water-soluble organic compound plays the role of dispersing the hydrophobic polycarbodiimide compound in an aqueous medium and improving the storage stability of the waterborne resin composition.

The total amount of the water-soluble organic compound blended is preferably 0.05 to 60.0 parts by mass, more preferably 0.07 to 55.0 parts by mass, more preferably 0.1 to 50.0 parts by mass, and further preferably 1.0 to 25.0 parts by mass per 100 parts by mass of the hydrophobic polycarbodiimide compound in view of the dispersibility of the hydrophobic polycarbodiimide compound in an aqueous medium and crosslinking performance.

When the content is 0.05 parts by mass or more, the dispersibility of the hydrophobic polycarbodiimide compound in an aqueous medium is good, and the storage stability of the waterborne resin composition can be improved. When the content is 60.0 parts by mass or less, the influence of a hydrophilic group of the water-soluble organic compound is suppressed, and a crosslinking agent having a carbodiimide group concentration at which the crosslinked waterborne resin can exhibit good water resistance and solvent resistance can be obtained.

When the alkylene glycol-based compound is included as the water-soluble organic compound, the effect of the present invention can be exhibited by using a smaller amount of the water-soluble organic compound blended, and the total amount of the water-soluble organic compound blended may be 30 parts by mass or less, and is more preferably 25 parts by mass or less, and further preferably 20 parts by mass or less per 100 parts by mass of the hydrophobic polycarbodiimide compound.

<Alkylene Glycol-Based Compound>

The alkylene glycol-based compound is a compound including an oxyalkylene group. Of such compounds, one or more selected from the group consisting of an ethylene glycol-based compound and a propylene glycol-based compound are preferable in view of good water solubility and versatility. More preferable examples include (poly)ethylene glycols, (poly)ethylene glycol ethers, (poly)ethylene glycol esters, (poly)propylene glycols, (poly)propylene glycol ethers, and (poly)propylene glycol esters.

As the alkylene glycol-based compound, a compound represented by the following formula (1) is more preferable.

$$R^2(OCHR^1CH_2)_nOR^3 \qquad (1)$$

In the formula (1), $R^1$ is preferably a hydrogen atom or a methyl group, and more preferably a hydrogen atom.

Preferably, $R^2$ and $R^3$ are each independently a hydrogen atom, a hydrocarbon group having 1 to 18 carbon atoms, or an acyl group having 2 to 18 carbon atoms and, in view of the dispersibility of the hydrophobic polycarbodiimide compound in an aqueous medium, miscibility with the waterborne resin, and the like, more preferably a hydrogen atom or an alkyl group having 1 to 3 carbon atoms. Further preferably, one is a hydrogen atom, and the other is a methyl group or an ethyl group, and more further preferably, one is a hydrogen atom and the other is a methyl group.

The n is preferably an integer of 1 to 70, more preferably 1 to 50, and further preferably 1 to 20 in view of the dispersibility of the hydrophobic polycarbodiimide compound in an aqueous medium, miscibility with a waterborne resin, and the like.

Examples of the alkylene glycol-based compound include polyethylene glycol, polyethylene glycol monomethyl ether, polyethylene glycol dimethyl ether, polyethylene glycol monolauryl ether, polypropylene glycol, and polyethylene glycol monobutyl ether acetate. Of these, polyethylene glycol, polyethylene glycol monomethyl ether, polyethylene glycol dimethyl ether, and polyethylene glycol monolauryl ether are preferable.

For example, when the compound represented by the formula (1) is polyethylene glycol monomethyl ether, the n is 6 or more, that is, the molecular weight is about 300 or more in view of stably dispersing the hydrophobic polycarbodiimide compound, and particularly preferably, the n is 20 or less, that is, the molecular weight is about 900 or less in view of compatibility with the hydrophobic polycarbodiimide compound. In addition, it is preferable to use such polyethylene glycol monomethyl ether in view of the storage stability of the crosslinking agent-containing liquid as well.

<Water-Soluble Polymer>

In the present invention, the water-soluble polymer refers to a compound other than the alkylene glycol-based compound. That is, the water-soluble polymer refers to a compound which has a repeating structure of a predetermined structural unit (monomer) other than an oxyalkylene group and which is water-soluble. The water-soluble polymer is regardless of the number of repetitions and the molecular weight and also encompasses a so-called oligomer.

The water-soluble polymer exhibits water solubility by having an ether group, a hydroxy group, a carboxy group, a sulfone group, a sulfate ester group, an amino group, an imino group, a quaternary ammonium cation, or the like in the molecule.

Examples of the water-soluble polymer include polyvinylpyrrolidone, polyvinyl alcohol, polyvinyl methyl ether, polyacrylamide, polyethyleneimine, vinyl alcohol-vinyl acetate copolymer, partially formalized polyvinyl alcohol, partially butyralized polyvinyl alcohol, vinylpyrrolidone-vinyl acetate copolymer, a polyacrylic acid salt, a polyvinylsulfuric acid salt, a poly(4-vinylpyridine) salt, polyamide, a polyallylamine salt, a condensed naphthalenesulfonic acid, styrene-(meth)acrylic acid salt copolymer, (meth)acrylic acid ester-(meth)acrylic acid salt copolymer, styrene-itaconic acid salt copolymer, itaconic acid ester-itaconic acid salt copolymer, vinylnaphthalene-(meth)acrylic acid salt copolymer, vinylnaphthalene-itaconic acid salt copolymer; a cellulose derivative such as carboxymethylcellulose; a starch derivative such as water-soluble starch, starch ester, starch xanthogenate, or starch acetate; and gelatin. Of these, polyvinylpyrrolidone, polyvinyl alcohol, polyethyleneimine, polyacrylic acid, polyacrylamide, carboxymethylcellulose, starch, and gelatin are preferable.

<Surfactant>

In the present invention, the surfactant refers to a compound other than the alkylene glycol-based compound or the water-soluble polymer. The "surfactant" as used herein means a compound having a hydrophilic moiety and a hydrophobic moiety, which acts on the interface between an aqueous medium and a hydrophobic substance to facilitate compatibility between both substances forming the interface.

Examples of the surfactant include a nonionic surfactant such as sorbitan monolaurate, polyoxyethylene sorbitan monolaurate, polyoxyethylene-glyceryl cocoate, polyoxyethylene-castor oil, polyglycerin oleate, polyoxyethylene-laurylamine, or polyoxyethylene sorbitol tetraoleate; an anionic surfactant such as an alkylbenzenesulfonate such as sodium dodecylbenzenesulfonate, an alkylsulfate such as sodium dodecylsulfate or sodium laurylsulfate, sodium N-cocoyl methyl taurate, sodium di-2-ethylhexyl sulfosuccinate, sodium-2-ethylhexyl sulfate, or α-sulfo fatty acid methyl ester sodium salt; a cationic surfactant such as benzalkonium chloride, dodecyltrimethylammonium chloride, tetradecylamine acetate, didecyldimethylammonium chloride, or tetradecyldimethylbenzylammonium chloride; and an amphoteric surfactant such as coconut oil dimethylaminoacetic acid betaine, cocamidopropyldimethylaminoacetic acid betaine, sodium lauryl diaminoethyl glycinate, or monosodium lauryl aminodiacetate.

The surfactant is preferably used in combination with the alkylene glycol-based compound in view of the dispersibility of the hydrophobic polycarbodiimide compound in an aqueous medium and the storage stability of the waterborne resin composition including the crosslinking agent. Of the surfactants, the use in combination with the anionic surfactant or the cationic surfactant is more preferable.

(Other Components)

In addition to the hydrophobic polycarbodiimide compound and the water-soluble organic compound, the waterborne resin crosslinking agent may include an additive such as a solvent, an antioxidant, an ultraviolet absorber, a thickener, an antifoaming agent, and a wettability improver as a blending component as long as it does not impair the effect of the present invention. In this case, the total amount of the polycarbodiimide compound and the water-soluble organic compound blended in the waterborne resin crosslinking agent is preferably 85% by mass or more, more preferably 90% by mass or more, and further preferably 95% by mass or more in view of efficiently exerting the crosslinking action.

In the present invention, it is not preferable for the crosslinking agent to include a polycarbodiimide compound other than the hydrophobic polycarbodiimide compound, that is, a hydrophilic polycarbodiimide compound, even if it is one of other components. As described above, a waterborne resin composition including a crosslinking agent into which a hydrophilic polycarbodiimide compound is blended is not preferable because it is inferior in storage stability.

(Method for Producing Waterborne Resin Crosslinking Agent)

The waterborne resin crosslinking agent can be produced by stirring and mixing the hydrophobic polycarbodiimide compound, the water-soluble organic compound, if necessary, an additive among the above other components, and the like. When these are mixed, an aqueous medium may be used to produce the waterborne resin crosslinking agent in advance as a waterborne resin crosslinking agent-containing liquid described later.

The method of stirring and mixing for obtaining the waterborne resin crosslinking agent is not particularly limited, and stirring and mixing can be carried out, for example by a known method using a rotating blade, a magnetic stirrer, or the like.

Conditions such as temperature and time at the time of mixing differ depending on the types of the hydrophobic polycarbodiimide compound, the water-soluble organic compound, and the like, and in view of efficient and uniform mixing, for example, the alkylene glycol-based compound and/or the water-soluble polymer is preferably added to the hydrophobic polycarbodiimide compound at 50 to 170° C. and stirred and mixed for 0.5 to 24 hours. When the surfactant is used as the water-soluble organic compound, water and the surfactant may be added to the hydrophobic polycarbodiimide compound and stirred and mixed without heating.

A waterborne resin crosslinking agent-containing liquid can also be obtained by adding a mixed solution prepared by dissolving the hydrophobic polycarbodiimide compound in an organic solvent dropwise to an aqueous solution of the water-soluble organic compound to prepare an emulsion and distilling off the organic solvent from this emulsion.

[Waterborne Resin Crosslinking Agent-Containing Liquid]

The waterborne resin crosslinking agent-containing liquid of the present invention includes the waterborne resin crosslinking agent and an aqueous medium. Preparation of the waterborne resin crosslinking agent as a liquid containing the same facilitates uniform addition to and mixing with the waterborne resin to be crosslinked, which is preferable for convenience of handling.

The concentration of the waterborne resin crosslinking agent in the waterborne resin crosslinking agent-containing liquid is appropriately determined in view of handleability in uniform addition to and mixing with the waterborne resin and the efficiency of the crosslinking action, and is preferably 10 to 100% by mass, more preferably 15 to 80% by mass, and further preferably 20 to 50% by mass.

The total content of the polycarbodiimide compound and the water-soluble organic compound in the waterborne resin crosslinking agent-containing liquid is preferably 10 to 100% by mass, more preferably 15 to 80% by mass, and further preferably 20 to 50% by mass.

(Aqueous Medium)

As the aqueous medium, a medium that can uniformly dissolve or disperse each component contained in the waterborne resin crosslinking agent is used, and examples thereof include hydrophilic solvents among water, alcohols, ethers, ketones, esters, and the like. These may be used singly or in combinations of two or more. Of these, water or a mixed solvent of water and a hydrophilic solvent is preferable. The aqueous medium is preferably water only in view of environmental consideration, cost, and the like.

Examples of the alcohols include methanol, isopropanol, n-butanol, 2-ethylhexyl alcohol, ethylene glycol, and propylene glycol. Examples of the ethers include ethylene glycol monoethyl ether, ethylene glycol monobutyl ether, ethylene glycol monohexyl ether, propylene glycol monoethyl ether, 3-methoxy-3-methylbutanol, diethylene glycol monomethyl ether, diethylene glycol monoethyl ether, and tetrahydrofuran. Examples of the ketones include methyl isobutyl ketone, cyclohexanone, isophorone, and acetylacetone. Examples of the esters include ethylene glycol monoethyl ether acetate and ethylene glycol monobutyl ether acetate.

(Other Components)

In addition to the waterborne resin crosslinking agent and the aqueous medium, the waterborne resin crosslinking agent-containing liquid may include an additive such as a solvent, an antioxidant, an ultraviolet absorber, a thickener, an antifoaming agent, and a wettability improver as long as it does not impair the effect of the present invention.

The solvent may include a solvent that is not a hydrophilic solvent and is derived from, for example, the solvent used in the production process of the waterborne resin crosslinking agent. The content of such a solvent that is not a hydrophilic solvent in the waterborne resin crosslinking agent-containing liquid is preferably 30% by mass or less, more preferably 20% by mass or less, and further preferably 10% by mass or less in view of the dispersibility of the waterborne resin crosslinking agent in the aqueous medium.

(Method for Producing Waterborne Resin Crosslinking Agent-Containing Liquid)

The waterborne resin crosslinking agent-containing liquid can be produced by mixing the waterborne resin crosslinking agent, the aqueous medium, if necessary, an additive among the above other components, and the like. The method of stirring and mixing is not particularly limited, and stirring and mixing can be carried out, for example by a known method using a rotating blade, a magnetic stirrer, or the like.

Conditions such as temperature and time at the time of mixing differ depending on the composition of the waterborne resin crosslinking agent, the type of the aqueous medium, and the like, and for example, when the waterborne resin crosslinking agent and the aqueous medium are mixed, it is preferable to stir and mix them at 20 to 100° C. for 0.5 to 5 hours in view of efficient and uniform mixing.

[Waterborne Resin Composition]

The waterborne resin composition of the present invention includes the waterborne resin crosslinking agent and a waterborne resin. The waterborne resin crosslinking agent in the waterborne resin composition may be included as the waterborne resin crosslinking agent-containing liquid.

The waterborne resin composition includes the waterborne resin crosslinking agent, which has excellent storage stability in a state in which it is included together with the waterborne resin, and thus crosslinking reaction by heating or the like can be carried out for at least about one week after production thereof, although it depends on the type of the waterborne resin, the additive(s) included therein, and the like. In addition, a cured product of a waterborne resin having excellent water resistance, solvent resistance, and water-resistant adhesion can be obtained by using the waterborne resin composition.

The content of the waterborne resin crosslinking agent in the waterborne resin composition is appropriately determined according to the type of the waterborne resin, the physical properties required for the cured product of the waterborne resin, and the like, and is preferably 0.2 to 40 parts by mass and more preferably 0.5 to 20 parts by mass per 100 parts by mass of the waterborne resin in view of a balance between crosslinking reactivity and cost and the like. The content of the waterborne resin crosslinking agent is preferably 1 part by mass or more, in particular, in view of sufficiently developing crosslinking reactivity, and is preferably 15 parts by mass or less in view of cost and suppressing the action as a plasticizer due to addition at a large amount.

The total content of the polycarbodiimide compound and the water-soluble organic compound is preferably 0.2 to 40 parts by mass, more preferably 0.5 to 20 parts by mass, and further preferably 1 to 15 parts by mass per 100 parts by mass of the waterborne resin.

(Waterborne Resin)

The waterborne resin is a resin having water solubility or water dispersibility. The waterborne resin can be crosslinked by a carbodiimide group, and is particularly preferably one having a hydrophilic crosslinkable group.

Specifically, the waterborne resin preferably has a group selected from the group consisting of a carboxy group, an amino group, and a hydroxyl group, which are each a hydrophilic group, more preferably has an alcoholic hydroxyl group and/or a carboxy group as a crosslinkable group, and further preferably has a carboxy group.

Examples of the waterborne resin include a polyester resin, an acrylic resin, a polyurethane resin, an epoxy resin, a styrene-acrylic resin, a melamine resin, a polyolefin resin, and a fluororesin. Of these, a polyester resin, an acrylic resin, a polyurethane resin, and an epoxy resin are preferably used. These may be used singly or in combinations of two or more.

(Other Components)

In addition to the waterborne resin crosslinking agent and the waterborne resin, the waterborne resin composition may include an additive such as other components as long as it does not impair the effect of the present invention. Specifically, solvents and various additive components such as a colorant, a filler, a dispersant, a plasticizer, a thickener, an ultraviolet absorber, and an antioxidant may be included in the waterborne resin composition, if necessary, depending on the intended use, the application, and the like.

(Method for Producing Waterborne Resin Composition)

The waterborne resin composition can be produced by stirring and mixing the waterborne resin crosslinking agent, the aqueous medium, if necessary, an additive among the above other components, and the like. The method of stirring and mixing is not particularly limited, and stirring and mixing can be carried out, for example by a known method using a rotating blade, a magnetic stirrer, or the like.

Conditions such as temperature and time at the time of mixing differ depending on the composition of the waterborne resin crosslinking agent, the type of the waterborne resin, and the like, and the mixing temperature is preferably 0 to 100° C. and more preferably 10 to 50° C. in view of efficient and uniform mixing. In view of reactivity and mixing efficiency of the waterborne resin crosslinking agent, the waterborne resin, the additive, and the like, the temperature is more preferably 20 to 30° C. The mixing time is preferably 0.1 to 2 hours and more preferably 0.3 to 1 hour.

The waterborne resin composition may be produced by mixing with the waterborne resin as the waterborne resin crosslinking agent-containing liquid in view of uniform mixing with the waterborne resin, ease of handling, and the like.

(Cured Product of Waterborne Resin)

Heating the waterborne resin composition causes crosslinking reaction to provide a cured product of the waterborne resin.

The heating temperature for curing the waterborne resin composition is appropriately set in view of promoting the crosslinking reaction within a range in which the waterborne resin composition is not discolored or thermally decomposed depending on the composition of the waterborne resin crosslinking agent, the type of the waterborne resin, and the like.

The waterborne resin composition produces a cured product of a waterborne resin having excellent water resistance and solvent resistance, and thus can be preferably used in various applications such as a paint, an ink, a fiber treatment agent, an adhesive, a coating agent, and a shaped product. In particular, the waterborne resin composition can also be preferably used for wet-on-wet coating. In the wet-on-wet coating, the coating film (resin film) formed from the waterborne resin composition is less likely to cause bleeding or poor adhesion between the laminated coating films because of promoted crosslinking reaction, and a good coating film can be efficiently formed.

The waterborne resin composition can also be applied to applications that require various other physical properties based on excellent crosslinkability, such as high tensile strength, excellent heat resistance, durability, adhesion, close adhesion, chipping resistance, scratch resistance, and compatibility. Specifically, the waterborne resin composition can be preferably applied in fields such as an automobile, construction, heavy-duty anticorrosion coating, food packaging, and healthcare.

EXAMPLES

Hereinafter, the present invention will be described in detail with reference to Examples, but the present invention is not limited thereto.

[Synthesis of Polycarbodiimide Compounds]

First, each polycarbodiimide compound was synthesized by the method shown in each Synthesis Example below. Details of the compounds as a starting material used in the Synthesis Examples are as follows.

The molecular weight herein is a calculated value or a catalog value.

<Diisocyanate Compounds>
  HMDI: Dicyclohexylmethane-4,4'-diisocyanate (molecular weight of 262.35)
  IPDI: Isophorone diisocyanate (molecular weight of 222.29)
  HDI: Hexamethylene diisocyanate (molecular weight of 168.19)
  XDI: m-Xylylene diisocyanate (molecular weight of 188.19)

<End-Capping Compounds>
  CHI: Cyclohexyl isocyanate (molecular weight of 125.17)
  CHA: Cyclohexylamine (molecular weight of 99.18)
  OA: n-Octanol (molecular weight of 130.23)
  MPEG200: Polyethylene glycol monomethyl ether (molecular weight of 200)
  MPEG550: Polyethylene glycol monomethyl ether (molecular weight of 550)

The degree of polymerization of the carbodiimide group in the following Synthesis Examples was determined as follows according to the synthesis method.

(1) When a polycarbodiimide compound is synthesized by simultaneously blending a diisocyanate compound and an end-capping compound, the degree of polymerization of the carbodiimide group is a value based on calculation.

(2) When a polycarbodiimide compound is synthesized by polycarbodiimidization reaction of the diisocyanate compound to synthesize an isocyanate-terminated polycarbodiimide and then capping reaction of a terminal isocyanate group, the degree of polymerization of the carbodiimide group of the isocyanate-terminated polycarbodiimide was determined by a potentiometric titration method (apparatus used: automatic titrator "COM-900," manufactured by Hiranuma Sangyo Co., Ltd.). Specifically, a solution of di-n-butylamine in toluene at a known concentration was mixed into the isocyanate-terminated polycarbodiimide obtained by the carbodiimidization reaction to react the terminal isocyanate group with di-n-butylamine, and the remaining di-n-butylamine was neutralized and titrated with a hydrochloric acid standard solution to calculate the amount of the isocyanate group remaining (amount of terminal NCO [% by mass]). From this amount of terminal NCO, the degree of polymerization of the carbodiimide group was determined.

Synthesis Example 1

100 parts by mass of HMDI, 23.9 parts by mass of CHI, and 1.2 parts by mass of 3-methyl-1-phenyl-2-phosphorene-1-oxide as a carbodiimidization catalyst were placed in a reaction vessel equipped with a reflux tube and a stirrer and were stirred and mixed at 180° C. for 47 hours under a nitrogen gas flow to be reacted, and it was confirmed by IR spectrum measurement (apparatus used: Fourier transform infrared spectrophotometer "FTIR-8200PC," manufactured by Shimadzu Corporation; the same applies hereinafter) that an absorption peak of the isocyanate group at a wavelength of 2200 to 2300 $cm^{-1}$ disappeared.

Thereafter, the reaction product was taken out from the reaction vessel and cooled to room temperature (25° C.) to obtain a pale-yellow clear liquid hydrophobic polycarbodiimide compound (P1) (molecular weight of 1078, degree of polymerization of carbodiimide group of 3, and number of carbodiimide groups in one molecule of 5).

Synthesis Example 2

100 parts by mass of HMDI and 0.5 parts by mass of 3-methyl-1-phenyl-2-phosphorene-1-oxide as a carbodiimidization catalyst were placed in a reaction vessel equipped with a reflux tube and a stirrer and were stirred and mixed at 180° C. for 28 hours under a nitrogen gas flow to carry out carbodiimidization reaction to obtain an isocyanate-terminated polycarbodiimide compound.

An absorption peak due to a carbodiimide group of the obtained isocyanate-terminated polycarbodiimide at a wavelength of around 2150 $cm^{-1}$ was confirmed by IR spectrum measurement. In addition, the amount of terminal NCO was 2.35% by mass, and the degree of polymerization of the carbodiimide group was 15.2.

Next, 84.3 parts by mass of the isocyanate-terminated polycarbodiimide compound was melted at 160° C., 4.7 parts by mass of CHA (the same molar equivalent as the terminal isocyanate group of the isocyanate-terminated polycarbodiimide compound) was added, and the resulting mixture was heated to 180° C. under stirring and reacted for 1.5 hours.

It was confirmed by IR spectrum measurement that an absorption peak of the isocyanate group at a wavelength of 2200 to 2300 $cm^{-1}$ disappeared, and then a yellow clear liquid reaction product was taken out from the reaction vessel. The reaction product was cooled to room temperature (25° C.) and pulverized using a roll granulator to obtain a hydrophobic polycarbodiimide compound (P2) (molecular weight of 3779).

Synthesis Example 3

100 parts by mass of HMDI and 0.5 parts by mass of 3-methyl-1-phenyl-2-phosphorene-1-oxide as a carbodiimidization catalyst were placed in a reaction vessel equipped with a reflux tube and a stirrer and were stirred and mixed at 170° C. for 18 hours under a nitrogen gas flow to carry out carbodiimidization reaction to obtain an isocyanate-terminated polycarbodiimide compound.

An absorption peak due to a carbodiimide group of the obtained isocyanate-terminated polycarbodiimide at a wavelength of around 2150 $cm^{-1}$ was confirmed by IR spectrum measurement. The amount of terminal NCO was 5.07% by mass, and the degree of polymerization of the carbodiimide group was 6.4.

Next, 85.5 parts by mass of the isocyanate-terminated polycarbodiimide compound was melted at 150° C., 13.4 parts by mass of OA (the same molar equivalent as the terminal isocyanate group of the isocyanate-terminated polycarbodiimide compound) was added, and the resulting mixture was heated to 180° C. under stirring and reacted for 2 hours.

It was confirmed by IR spectrum measurement that an absorption peak of the isocyanate group at a wavelength of 2200 to 2300 $cm^{-1}$ disappeared, and then the reaction product was taken out from the reaction vessel. The reaction product was cooled to room temperature (25° C.) to obtain a pale-yellow clear liquid hydrophobic polycarbodiimide compound (P3) (molecular weight of 1920).

Synthesis Example 4

A hydrophobic polycarbodiimide compound (P4) was obtained (molecular weight of 2060) in the same manner as in the synthesis of the hydrophobic polycarbodiimide compound (P3) except that 20.5 parts by mass of MPEG200 was used instead of OA in the synthesis of the hydrophobic polycarbodiimide compound (P3).

Synthesis Example 5

100 parts by mass of IPDI, 28.1 parts by mass of CHI, and 2.0 parts by mass of 3-methyl-1-phenyl-2-phosphorene-1-oxide as a carbodiimidization catalyst were placed in a reaction vessel equipped with a reflux tube and a stirrer and were stirred and mixed at 150° C. for 24 hours under a nitrogen gas flow to be reacted, and it was confirmed by IR spectrum measurement that an absorption peak of the isocyanate group at a wavelength of 2200 to 2300 $cm^{-1}$ disappeared.

Thereafter, the reaction product was taken out from the reaction vessel and cooled to room temperature (25° C.) to obtain a pale-yellow clear liquid hydrophobic polycarbodiimide compound (P5) (molecular weight of 918, degree of polymerization of carbodiimide group of 3, and number of carbodiimide groups in one molecule of 5).

Synthesis Example 6

100 parts by mass of HDI, 28.1 parts by mass of CHI, 2.0 parts by mass of 3-methyl-1-phenyl-2-phosphorene-1-oxide as a carbodiimidization catalyst, and 100 parts by mass of propylene glycol monomethyl ether acetate as a solvent were placed in a reaction vessel equipped with a reflux tube and a stirrer and were stirred and mixed at 150° C. for 24 hours under a nitrogen gas flow to be reacted, and it was confirmed by IR spectrum measurement that an absorption peak of the isocyanate group at a wavelength of 2200 to 2300 $cm^{-1}$ disappeared.

Thereafter, the solvent was distilled off under reduced pressure and the reaction product was taken out from the reaction vessel and cooled to room temperature (25° C.) to obtain a pale-yellow clear liquid hydrophobic polycarbodiimide compound (P6) (molecular weight of 702, degree of polymerization of carbodiimide group of 3, and number of carbodiimide groups in one molecule of 5).

Synthesis Example 7

100 parts by mass of XDI, 33.3 parts by mass of CHI, 2.0 parts by mass of 3-methyl-1-phenyl-2-phosphorene-1-oxide as a carbodiimidization catalyst, and 100 parts by mass of propylene glycol monomethyl ether acetate as a solvent were placed in a reaction vessel equipped with a reflux tube and a stirrer and were stirred and mixed at 150° C. for 24 hours under a nitrogen gas flow to be reacted, and it was confirmed by IR spectrum measurement that an absorption peak of the isocyanate group at a wavelength of 2200 to 2300 cm$^{-1}$ disappeared.

Thereafter, the solvent was distilled off under reduced pressure and the reaction product was taken out from the reaction vessel and cooled to room temperature (25° C.) to obtain a pale-yellow clear liquid hydrophobic polycarbodiimide compound (P7) (molecular weight of 782, degree of polymerization of carbodiimide group of 3, and number of carbodiimide groups in one molecule of 5).

Synthesis Example 8

A hydrophilic polycarbodiimide compound (Q1) was obtained (molecular weight of 2760) in the same manner as in the synthesis of the hydrophobic polycarbodiimide compound (P3) except that 56.7 parts by mass of MPEG550 was used instead of OA in the synthesis of the hydrophobic polycarbodiimide compound (P3).

[Production of Waterborne Resin Crosslinking Agent-Containing Liquid]

Various waterborne resin crosslinking agent-containing liquids (hereinafter, abbreviated as "crosslinking agent-containing liquids") were produced using the polycarbodiimide compounds obtained in the above Synthetic Examples and various water-soluble organic compounds. Details of the water-soluble organic compounds used in the following Examples and Comparative Examples are as follows.

<Alkylene Glycol-Based Compounds (A)>
  MPEG550: Polyethylene glycol monomethyl ether, molecular weight of 550
  MPEG3000: Polyethylene glycol monomethyl ether, molecular weight of 3000
  MPEG200: Polyethylene glycol monomethyl ether, molecular weight of 200
  PEG: Polyethylene glycol, molecular weight of 500
  DMPEG: Polyethylene glycol dimethyl ether, molecular weight of 550
  LPEG: Polyethylene glycol monolauryl ether, molecular weight of 500

<Water-Soluble Polymers (B)>
  PVP: Polyvinylpyrrolidone; "Polyvinylpyrrolidone K-30," manufactured by Nippon Shokubai Co., Ltd., molecular weight of about 80000 to 120000
  PVA: Polyvinyl alcohol; "JP-05E," manufactured by Japan Vam & Poval Co., Ltd., molecular weight of about 20000

<Surfactants (C)>
  LAS: Sodium dodecylbenzenesulfonate, anionic surfactant
  BZC: Benzalkonium chloride, cationic surfactant, 50% by mass aqueous solution
  SBM: Polyoxyethylene sorbitol tetraoleate, nonionic surfactant Example A1

100 parts by mass of the hydrophobic polycarbodiimide compound (P1) as a polycarbodiimide compound and 4.2 parts by mass of MPEG550 as a water-soluble organic compound were blended, stirred, and mixed at 150° C. for 4 hours, and then diluted with 150 parts by mass of ion-exchanged water. 3.1 parts by mass of LAS was added thereto, and the resulting mixture was stirred and mixed to obtain a crosslinking agent-containing liquid (1).

Examples A2 to A17, A19, and A20 and Comparative Example A2

Crosslinking agent-containing liquids (2) to (17), (19), (20), and (2') were each obtained in the same manner as in Example A1 except that the respective predetermined polycarbodiimide compounds and water-soluble organic compounds shown in Table 1 below were blended.

Example A18

A solution of the hydrophobic polycarbodiimide compound (P2) was prepared by mixing 100 parts by mass of the hydrophobic polycarbodiimide compound (P2) and 130 parts by mass of a mixed solvent of tetrahydrofuran and methanol (mixing mass ratio of 5/1).

The solution of the hydrophobic polycarbodiimide compound (P2) was added dropwise to an aqueous solution prepared by mixing 4.2 parts by mass of MPEG 550 and 400 parts by mass of ion-exchanged water to obtain a milky white emulsion. The mixed solvent was distilled off from this emulsion to obtain a crosslinking agent-containing liquid (18) (crosslinking agent concentration of about 20% by mass).

Example A21

100 parts by mass of the hydrophobic polycarbodiimide compound (P1) was diluted with 225 parts by mass of ion-exchanged water. 50.0 parts by mass of LAS was added thereto, and the resulting mixture was stirred and mixed to obtain a crosslinking agent-containing liquid (21).

Example A22

100 parts by mass of the hydrophobic polycarbodiimide compound (P1) was diluted with 175 parts by mass of ion-exchanged water. 100.0 parts by mass (50.0% by mass of active component) of BZC was added thereto, and the resulting mixture was stirred and mixed to obtain a crosslinking agent-containing liquid (22).

In Table 1 below, the amount of BZC blended is shown as the amount of the active component.

Example A23

100 parts by mass of the hydrophobic polycarbodiimide compound (P1) was diluted with 225 parts by mass of ion-exchanged water. 50.0 parts by mass of SBM was added thereto, and the resulting mixture was stirred and mixed to obtain a crosslinking agent-containing liquid (23).

Comparative Example A1

100 parts by mass of the hydrophobic polycarbodiimide compound (P1) and 2.1 parts by mass of the hydrophilic polycarbodiimide compound (Q1) were blended, stirred, and mixed at 150° C. for 4 hours, and then diluted with 150 parts by mass of ion-exchanged water. 3.1 parts by mass of LAS was added thereto, and the resulting mixture was stirred and mixed to obtain a crosslinking agent-containing liquid (1').

means that there is no viscosity change, and a viscosity change rate closer to 0% indicates better storage stability.

The viscosity was measured using a B-type viscometer ("TVB-10M," rotor: TM2, manufactured by Toki Sangyo Co., Ltd.) at a temperature of 20° C. and a rotation speed of 60 rpm.

TABLE 1

| | | Crosslinking agent-containing liquid No. | Polycarbodiimide compound | | | Water-soluble organic compound | | |
|---|---|---|---|---|---|---|---|---|
| | | | No. | Diisocyanate compound | End-capping compound | Amount blended [parts by mass] | Type | Amount blended [parts by mass] | NCN equivalent |
| Examples | A1 | 1 | P1 | HMDI | CHI | 100 | (A) MPEG550 | 4.2 | 231 |
| | | | | | | | (C) LAS | 3.1 | |
| | A2 | 2 | P1 | HMDI | CHI | 100 | (A) MPEG550 | 14.3 | 254 |
| | | | | | | | (C) LAS | 3.1 | |
| | A3 | 3 | P1 | HMDI | CHI | 100 | (A) MPEG3000 | 4.2 | 231 |
| | | | | | | | (C) LAS | 3.1 | |
| | A4 | 4 | P1 | HMDI | CHI | 100 | (A) MPEG200 | 4.2 | 231 |
| | | | | | | | (C) LAS | 3.1 | |
| | A5 | 5 | P1 | HMDI | CHI | 100 | (A) MPEG550 | 4.2 | 225 |
| | A6 | 6 | P1 | HMDI | CHI | 100 | (A) MPEG550 | 0.1 | 216 |
| | A7 | 7 | P1 | HMDI | CHI | 100 | (A) MPEG550 | 25.0 | 270 |
| | A8 | 8 | P1 | HMDI | CHI | 100 | (A) PEG | 4.2 | 231 |
| | | | | | | | (C) LAS | 3.1 | |
| | A9 | 9 | P1 | HMDI | CHI | 100 | (A) DMPEG | 4.2 | 231 |
| | | | | | | | (C) LAS | 3.1 | |
| | A10 | 10 | P1 | HMDI | CHI | 100 | (A) LPEG | 4.2 | 231 |
| | | | | | | | (C) LAS | 3.1 | |
| | A11 | 11 | P2 | HMDI | CHA | 100 | (A) MPEG550 | 4.2 | 271 |
| | | | | | | | (C) LAS | 3.1 | |
| | A12 | 12 | P2 | HMDI | CHA | 100 | (A) MPEG550 | 14.3 | 325 |
| | | | | | | | (C) LAS | 3.1 | |
| | A13 | 13 | P3 | HMDI | OA | 100 | (A) MPEG550 | 4.2 | 472 |
| | | | | | | | (C) LAS | 3.1 | |
| | A14 | 14 | P4 | HMDI | MPEG200 | 100 | (A) MPEG550 | 4.2 | 442 |
| | | | | | | | (C) LAS | 3.1 | |
| | A15 | 15 | P5 | IPDI | CHI | 100 | (A) MPEG550 | 4.2 | 197 |
| | | | | | | | (C) LAS | 3.1 | |
| | A16 | 16 | P6 | HDI | CHI | 100 | (A) MPEG550 | 4.2 | 151 |
| | | | | | | | (C) LAS | 3.1 | |
| | A17 | 17 | P7 | XDI | CHI | 100 | (A) MPEG550 | 4.2 | 168 |
| | | | | | | | (C) LAS | 3.1 | |
| | A18 | 18 | P2 | HMDI | CHA | 100 | (A) MPEG550 | 4.2 | 262 |
| | A19 | 19 | P1 | HMDI | CHI | 100 | (B) PVP | 4.2 | 236 |
| | A20 | 20 | P1 | HMDI | CHI | 100 | (B) PVA | 4.2 | 236 |
| | A21 | 21 | P1 | HMDI | CHI | 100 | (C) LAS | 50.0 | 431 |
| | A22 | 22 | P1 | HMDI | CHI | 100 | (C) BZC | 50.0 | 431 |
| | A23 | 23 | P1 | HMDI | CHI | 100 | (C) SBM | 50.0 | 431 |
| Comparative Examples | A1 | 1' | P1 | HMDI | CHI | 100 | (C) LAS | 3.1 | 227 |
| | | | Q1 | HMDI | MPEG550 | 2.1 | | | |
| | A2 | 2' | Q1 | HMDI | MPEG550 | 100 | (A) MPEG550 | 4.2 | 463 |
| | | | | | | | (C) LAS | 3.1 | |

[Preparation and Evaluation of Waterborne Resin Compositions (1)]

Various waterborne resin compositions were prepared using the crosslinking agent-containing liquids produced in the above Examples and Comparative Examples and various waterborne resins, and evaluation tests of the items shown in the following (1) to (4) were carried out. The wet-on-wet coating test of (4) was carried out only on the waterborne polyurethane resin compositions. The results of each evaluation test are shown in Tables 2 to 5 below for each type of waterborne resin composition.

(1) Storage Stability Test

A storage stability test was carried out by storing the waterborne resin composition at 50° C. The viscosity immediately after the preparation and that after a lapse of 30 days were measured, and the rate of change of the viscosity after the lapse of 30 days with respect to the viscosity immediately after the preparation was determined, thereby evaluating the storage stability. A viscosity change rate of 0%

The viscosity change rate was evaluated based on the following evaluation criteria. In the case of rating AA, A, B, or C, it can be deemed that the waterborne resin composition has sufficient storage stability.

<Evaluation Criteria>

AA: Viscosity change rate of less than 3%

A: Viscosity change rate of 3% or more and less than 10%

B: Viscosity change rate of 10% or more and less than 20%

C: Viscosity change rate of 20% or more and less than 30%

D: Viscosity change rate of 30% or more and less than 50%

E: Viscosity change rate of 50% or more (2) Water Resistance Test

The waterborne resin composition was applied onto an aluminum plate using a wire rod No. 32 bar coater, dried at 80° C. for 10 minutes, and then left to stand at room temperature (25° C.) for 1 day to prepare a coating film sample.

A water resistance test was carried out by placing absorbent cotton impregnated with ion-exchanged water on each coating film sample and leaving it to stand for 24 hours.

The state of the coating film sample after the test was visually observed, and was scored on a scale of 4 points based on the following evaluation criteria, and the average score thereof for 10 tests was determined. A higher average score shows a better water resistance of the coating film formed from the waterborne resin composition.

<Scoring Criteria>
4 points: No change
3 points: Contour mark on the whole
2 points: Slightly less transparent
1 point: Overall opaque or partially foamed
0 points: Overall foamed or cracking in the coating film In Tables 2 to 5 below, a rating is given by classifying the average score according to the following criteria. In the case of rating A, B, or C, it can be deemed that the waterborne resin composition can form a coating film having sufficient water resistance.

<Classification Criteria>
A: 4 points
B: 3 points or more and less than 4 points
C: 2 points or more and less than 3 points
D: 1 point or more and less than 2 points
E: less than 1 point (3) Solvent Resistance Test The waterborne resin composition was applied onto an aluminum plate using a wire rod No. 32 bar coater and dried at 80° C. for 10 minutes to prepare a coating film sample.

Each coating sample was subjected to a solvent resistance test involving double rubbing the sample with absorbent cotton (load of 900 g/cm$^2$) impregnated with a 70% by mass ethanol aqueous solution as a solvent 50 times back and forth using a friction tester ("FR-1B," manufactured by Suga Test Instruments Co., Ltd.).

The state of the coating film sample after the test was visually observed, and the whitening properties, the remaining coating film area, and the grayscale (coloring condition of the absorbent cotton after double rubbing) were scored based on the following evaluation criteria. The average score of the three types of evaluation was calculated with a maximum of 5 points for each, and the average of this average score for two tests was used as the overall evaluation score. A higher overall evaluation score shows a better organic solvent resistance of the coating film formed from the waterborne resin composition.

<Evaluation Criteria>
[Whitening Properties]
5 points: No change
4 points: Light rubbing mark or slight whitening
3 points: Partially whitened
2 points: Overall whitened
1 point: Partially melted
0 points: Completely melted

[Remaining Coating Film Area]
5 points: 100%
4.5 points: 95% or more and less than 100%
4 points: 85% or more and less than 95%
3.5 points: 75% or more and less than 85%
3 points: 60% or more and less than 75%
2.5 points: 45% or more and less than 60%
2 points: 40% or more and less than 45%
1.5 points: 25% or more and less than 40%
1 point: 10% or more and less than 25%
0 points: less than 10%

[Gray Scale]

The evaluation criteria were based on the determination of Grey scale for assessing staining of JIS L 0805: 2005, and the grade number of a determination stage was used as the score. Grade 5 (5 points) is the case of not being colored at all, and grade 1 (1 point) is the case of being remarkably colored.

In Tables 2 to 5 below, a rating is given by classifying the overall evaluation score according to the following criteria. In the case of rating A, B, or C, it can be deemed that the waterborne resin composition can form a coating film having sufficient solvent resistance.

<Classification Criteria>
A: 4 points or more
B: 3 points or more and less than 4 points
C: 2 points or more and less than 3 points
D: 1 point or more and less than 2 points
E: less than 1 point (4) Wet-on-Wet Coating Evaluation The waterborne resin composition was applied onto an aluminum plate using an air spray under a condition providing a dry film thickness of 30 μm, and was set for 10 minutes. The resulting plate was coated with the same waterborne resin composition using an air spray (dry film thickness of 15 μm, 45 μm in total), preheated at 80° C. for 3 minutes, then top-coated with a two-component curable polyurethane clear paint (dry film thickness of 30 μm), and baked at 80° C. to obtain a multi-layer coating film.

When the appearance of the obtained multi-layer coating film was visually observed, no abnormality was found in the appearance of the coating film regardless of which of the waterborne resin compositions was used.

The multi-layer coating film was subjected to a water resistance test and a chemical resistance test in the same manner as in (2) and (3) above.

In addition, the adhesion (interlayer adhesion) between both layers, namely the coating film made of the waterborne resin composition and the coating film made of the polyurethane clear paint, which constitute the multi-layer coating film, was evaluated by a cross-cut test according to ASTM D3359-B. The test conditions were as follows: in an environment of 25° C., 6×6 grids were prepared using a cutter at intervals of 2 mm, a tape having an adhesive strength of 6.7 N/cm was attached thereto, and the tape was peeled off. Evaluation was made by the amount (area) of the coating film remaining. The evaluation classification is as follows.

<Evaluation Classification>
0: No flaking
1: less than 5% flaking
2: 5% or more and less than 15% flaking
3: 15% or more and less than 35% flaking
4: 35% or more and less than 65% flaking
5: 65% or more flaking When the evaluation classification is 0 or 1, it can be deemed that the interlayer adhesion is good.

[Waterborne Polyurethane Resin Composition]

Example B1

The crosslinking agent-containing liquid (1) (crosslinking agent concentration of 40% by mass) was added in an amount, on an as-is basis, of 3.5 parts by mass (1.4 parts by mass of a crosslinking agent) to 285 parts by mass (100 parts by mass of solids) of a waterborne polyurethane resin ("Sancure (registered trademark) 777," manufactured by The Lubrizol Corporation, 35% by mass of solids), and the resultant was mixed to prepare a waterborne resin composition.

Examples B2 to B27 and Comparative Examples B1 to B3

Waterborne resin compositions were prepared in the same manner as in Example B1 except that in Example B1, the types and amounts blended of the crosslinking agents shown in Table 2 below were used.

In Table 2 below, the amount of the crosslinking agent blended is shown in terms of the amount per 100 parts by mass of solids of the waterborne polyurethane resin.

TABLE 2

|  |  | Crosslinking agent-containing liquid | | | Coating film evaluation | | Wet-on-wet coating evaluation | | |
|---|---|---|---|---|---|---|---|---|---|
|  |  |  | Amount blended [parts by mass] | | | | | | |
|  |  | No. | Crosslinking agent | (as is) | Storage stability | Water resistance | Solvent resistance | Water resistance | Solvent resistance | Interlayer adhesion |
| Examples | B1 | 1 | 1.4 | (3.5) | AA | B | B | A | B | 1 |
|  | B2 | 1 | 2 | (5) | AA | A | A | A | A | 0 |
|  | B3 | 1 | 5 | (12.5) | AA | A | A | A | A | 0 |
|  | B4 | 1 | 7 | (17.5) | B | A | A | A | A | 0 |
|  | B5 | 2 | 2 | (5) | AA | A | A | A | A | 0 |
|  | B6 | 3 | 2 | (5) | B | B | B | B | B | 0 |
|  | B7 | 4 | 2 | (5) | B | A | A | A | A | 0 |
|  | B8 | 5 | 2 | (5) | B | A | A | A | A | 0 |
|  | B9 | 6 | 2 | (5) | B | A | A | A | A | 0 |
|  | B10 | 7 | 2 | (5) | B | B | B | B | B | 0 |
|  | B11 | 8 | 2 | (5) | B | A | A | A | A | 0 |
|  | B12 | 9 | 2 | (5) | B | A | A | A | A | 0 |
|  | B13 | 10 | 2 | (5) | B | A | A | A | A | 0 |
|  | B14 | 10 | 5 | (12.5) | B | A | A | A | A | 0 |
|  | B15 | 11 | 2 | (10) | AA | A | A | A | A | 0 |
|  | B16 | 12 | 2 | (5) | AA | A | A | A | A | 0 |
|  | B17 | 13 | 2 | (5) | AA | A | A | B | A | 0 |
|  | B18 | 14 | 2 | (5) | AA | B | A | B | A | 0 |
|  | B19 | 15 | 2 | (5) | A | A | A | A | A | 0 |
|  | B20 | 16 | 2 | (5) | A | A | A | A | A | 0 |
|  | B21 | 17 | 2 | (5) | A | A | A | A | A | 0 |
|  | B22 | 18 | 2 | (10) | B | A | A | A | A | 0 |
|  | B23 | 19 | 2 | (5) | C | A | A | B | B | 0 |
|  | B24 | 20 | 2 | (5) | C | A | A | B | B | 0 |
|  | B25 | 21 | 2 | (5) | C | C | C | C | C | 0 |
|  | B26 | 22 | 2 | (5) | C | C | C | C | C | 0 |
|  | B27 | 23 | 2 | (5) | C | C | C | C | C | 0 |
| Comparative Examples | B1 | 1' | 2 | (5) | D | D | D | D | D | 2 |
|  | B2 | 1' | 1.4 | (3.5) | C | C | D | C | D | 3 |
|  | B3 | 2' | 2 | (5) | E | D | D | D | D | 2 |

[Waterborne Acrylic Resin Composition]

Example C1

The crosslinking agent-containing liquid (1) (crosslinking agent concentration of 40% by mass) was added in an amount, on an as-is basis, of 3.5 parts by mass (1.4 parts by mass of a crosslinking agent) to 250 parts by mass (100 parts by mass of solids) of a waterborne acrylic resin ("AC261P," manufactured by the Dow Chemical Company, about 40% by mass of resin solids), and the resultant was mixed to prepare a waterborne resin composition.

Examples C2 to C4 and Comparative Examples C1 to C3

Waterborne resin compositions were prepared in the same manner as in Example C1 except that in Example C1, the blending compositions of the crosslinking agent-containing liquids were changed as shown in Table 3 below.

In Table 3, the amount of the crosslinking agent blended is shown in terms of the amount per 100 parts by mass of solids of the waterborne acrylic resin.

TABLE 3

| | | Crosslinking agent-containing liquid | | | | Coating film evaluation | | |
|---|---|---|---|---|---|---|---|---|
| | | | Amount blended [parts by mass] | | | | | |
| | | No. | Crosslinking agent | (as is) | Storage stability | Water resistance | Solvent resistance | |
| Examples | C1 | 1 | 1.4 | (3.5) | A | B | B | |
| | C2 | 1 | 2 | (5) | A | A | A | |
| | C3 | 1 | 5 | (12.5) | A | A | A | |
| | C4 | 1 | 7 | (17.5) | A | A | A | |
| Comparative Examples | C1 | 1' | 2 | (5) | D | B | B | |
| | C2 | 1' | 1.4 | (3.5) | C | C | C | |
| | C3 | 2' | 2 | (5) | E | D | D | |

[Waterborne Polyester Resin Composition]

Example D1

The crosslinking agent-containing liquid (1) (crosslinking agent concentration of 40% by mass) was added in an amount, on an as-is basis, of 3.5 parts by mass (1.4 parts by mass of a crosslinking agent) to 400 parts by mass (100 parts by mass of solids) of a waterborne polyester resin ("PLAS COAT (registered trademark) Z-730," manufactured by GOO Chemical Co., Ltd., 25% by mass of resin solids), and the resultant was mixed to prepare a waterborne resin composition.

Examples D2 to D4 and Comparative Examples D1 to D3

Waterborne resin compositions were prepared in the same manner as in Example D1 except that in Example D1, the blending compositions of the crosslinking agent-containing liquids were changed as shown in Table 4 below.

In Table 4, the amount of the crosslinking agent blended is shown in terms of the amount per 100 parts by mass of solids of the waterborne polyester resin.

TABLE 4

| | | Crosslinking agent-containing liquid | | | | Coating film evaluation | | |
|---|---|---|---|---|---|---|---|---|
| | | | Amount blended [parts by mass] | | | | | |
| | | No. | Crosslinking agent | (as is) | Storage stability | Water resistance | Solvent resistance | |
| Examples | D1 | 1 | 1.4 | (3.5) | A | B | B | |
| | D2 | 1 | 2 | (5) | A | B | B | |
| | D3 | 1 | 5 | (12.5) | A | A | A | |
| | D4 | 1 | 7 | (17.5) | A | A | A | |
| Comparative Examples | D1 | 1' | 2 | (5) | D | B | B | |
| | D2 | 1' | 1.4 | (3.5) | C | C | C | |
| | D3 | 2' | 2 | (5) | E | D | D | |

[Waterborne Epoxy Resin Composition]

Example E1

The crosslinking agent-containing liquid (1) (crosslinking agent concentration of 40% by mass) was added in an amount, on an as-is basis, of 3.5 parts by mass (1.4 parts by mass of a crosslinking agent) to 133 parts by mass (100 parts by mass of solids) of a waterborne epoxy resin (carboxylic acid-modified "EM-85-75W" (manufactured by DIC Corporation), 75% by mass of resin solids), and the resultant was mixed to prepare a waterborne resin composition.

Examples E2 to E4 and Comparative Examples E1 to E3

Waterborne resin compositions were prepared in the same manner as in Example E1 except that in Example E1, the blending compositions of the crosslinking agent-containing liquids were changed as shown in Table 5 below.

In Table 5, the amount of the crosslinking agent blended is shown in terms of the amount per 100 parts by mass of solids of the waterborne epoxy resin.

TABLE 5

|  |  | Crosslinking agent-containing liquid | | | Coating film evaluation | | |
|---|---|---|---|---|---|---|---|
|  |  |  | Amount blended [parts by mass] | | | | |
|  | No. | Crosslinking agent | (as is) | Storage stability | Water resistance | Solvent resistance |
| Examples | E1 | 1 | 1.4 | (3.5) | A | B | B |
|  | E2 | 1 | 2 | (5) | A | A | A |
|  | E3 | 1 | 5 | (12.5) | A | A | A |
|  | E4 | 1 | 7 | (17.5) | A | A | A |
| Comparative Examples | E1 | 1' | 2 | (5) | D | B | B |
|  | E2 | 1' | 1.4 | (3.5) | C | C | C |
|  | E3 | 2' | 2 | (5) | E | D | D |

[Preparation and Evaluation of Waterborne Resin Compositions (2)]

Regarding representative examples of the crosslinking agent-containing liquids of the above Examples and Comparative Examples, waterborne resin compositions for fiber treatment were prepared, and evaluation tests of the items shown in the following (5) and (6) were carried out. The results of these evaluation tests are shown in Table 6 below.

[Waterborne Resin Compositions for Fiber Treatment]

Example F1

17 parts by mass of a waterborne resin crosslinking agent-containing liquid (waterborne resin crosslinking agent concentration of about 40% by mass) (about 7 parts by mass of waterborne resin crosslinking agent), 178.5 parts by mass of a dye ("Dyestone (registered trademark) X Color Blue MX," manufactured by Matsui Shikiso Chemical Co., Ltd.), and 6176 parts by mass of ion-exchanged water were added to 714 parts by mass (100 parts by mass of solids) of a waterborne acrylic resin ("BINDER EDC-250," manufactured by Dainichiseika Color & Chemicals Mfg. Co., Ltd., aqueous dispersion with 14% by mass of resin solids), and the resultant was mixed to prepare a waterborne resin composition for fiber treatment.

Examples F2 to F15 and Comparative Examples F1 to F3

Waterborne resin compositions were prepared in the same manner as in Example F1 except that in Example F1, the blending compositions of the crosslinking agent-containing liquids were changed as shown in Table 6 below.

In Table 6, the amount of the crosslinking agent blended is shown in terms of the amount per 100 parts by mass of solids of the waterborne acrylic resin.

(5) Storage Stability Test

The storage stability was evaluated in the same manner as in the section "(1) Storage stability test" described above.

(6) Water Resistance Test

A gray fabric (cotton) was dipped in the waterborne resin composition for fiber treatment, and the gray fabric impregnated with the waterborne resin composition was dried in a dryer at 100° C. for 2 minutes and then left to stand at 25° C. for 1 day to obtain a fabric sample.

Each fabric sample was subjected to a color fastness test involving moving water-impregnated absorbent cotton (standard adjacent fabric) (load of 900 g/cm²) 100 times back and forth using a friction tester ("Model FR-1B," manufactured by Suga Test Instruments Co., Ltd.), and this test was used as a water resistance test.

The state of the fabric sample and the standard adjacent fabric after the test was visually observed to grade the discoloration (change in color) of the fabric sample and the color transfer (staining) to the standard adjacent fabric based on the grayscales of JIS L 0804: 2004 and JIS L 0805: 2005, respectively, and the grade was used as the score.

For discoloration, grade 5 (5 points) is the case of not being discolored at all, and grade 1 (1 point) is the case of being remarkably discolored. For color transfer, grade 5 (5 points) is the case of not being colored at all, and grade 1 (1 point) is the case of being remarkably colored. The average score of the respective evaluation scores of discoloration and color transfer was calculated, and the average of this average score for two tests was used as the overall evaluation score.

In Table 6 below, a rating is given by classifying the overall evaluation score according to the following criteria. In the case of rating A or B, it can be deemed that the waterborne resin composition for fiber treatment can impart good water resistance to the fiber.

<Classification Criteria>

A: 4 points or more
B: 3 points or more and less than 4 points
C: 2 points or more and less than 3 points
D: 1 point or more and less than 2 points
E: less than 1 point

TABLE 6

|  |  | Crosslinking agent-containing liquid | | | | Coating film evaluation |
|---|---|---|---|---|---|---|
|  |  |  | Amount blended [parts by mass] | | | |
|  | No. | Crosslinking agent | (as is) | Storage stability | Water resistance |
| Examples | F1 | 1 | 7 | (17) | AA | A |
|  | F2 | 1 | 10 | (25) | AA | A |
|  | F3 | 2 | 10 | (25) | AA | A |
|  | F4 | 11 | 10 | (50) | AA | A |
|  | F5 | 12 | 10 | (25) | AA | A |
|  | F6 | 13 | 10 | (25) | AA | B |
|  | F7 | 14 | 10 | (25) | AA | B |
|  | F8 | 15 | 10 | (25) | AA | A |
|  | F9 | 16 | 10 | (25) | AA | A |
|  | F10 | 17 | 10 | (25) | AA | A |
|  | F11 | 18 | 10 | (50) | A | A |
|  | F12 | 19 | 10 | (25) | A | B |
|  | F13 | 20 | 10 | (25) | A | B |
|  | F14 | 21 | 10 | (25) | A | B |
|  | F15 | 22 | 10 | (25) | A | B |

TABLE 6-continued

| | | Crosslinking agent-containing liquid | | | Coating film evaluation | |
|---|---|---|---|---|---|---|
| | | | Amount blended [parts by mass] | | | |
| | No. | Crosslinking agent | (as is) | Storage stability | Water resistance |
| Comparative Examples | F1 | 1' | 10 | (25) | C | C |
| | F2 | 1' | 7 | (17) | B | B |
| | F3 | 2' | 10 | (25) | D | C |

As can be seen from the results shown in Tables 2 to 6, it was found that the waterborne resin crosslinking agent of the present invention can improve the storage stability of a waterborne resin composition including a waterborne resin together with the crosslinking agent.

In addition, the water resistance, and the solvent resistance of a cured product (coating film or resin film) of the waterborne resin can also be improved by using the waterborne resin crosslinking agent.

In addition, as can be seen from the results shown in Table 2, it was found that a good multi-layer coating film can be formed even in wet-on-wet coating by using the waterborne resin crosslinking agent of the present invention.

The invention claimed is:

1. A waterborne resin crosslinking agent comprising a polycarbodiimide compound and a water-soluble organic compound as blending components, wherein
    the polycarbodiimide compound is a hydrophobic polycarbodiimide compound and does not include a hydrophilic polycarbodiimide compound, and
    the water-soluble organic compound includes an alkylene glycol-based compound, and optionally one or more of a water-soluble polymer other than the alkylene glycol-based compound, and a surfactant other than the alkylene glycol-based compound or the water-soluble polymer.

2. The waterborne resin crosslinking agent according to claim 1, wherein a total amount of the water-soluble organic compound blended is 0.05 to 60.0 parts by mass per 100 parts by mass of the hydrophobic polycarbodiimide compound.

3. The waterborne resin crosslinking agent according to claim 1, wherein the hydrophobic polycarbodiimide compound has a structure in which all terminal isocyanate groups are capped with an end-capping compound, and the end-capping compound has one amino group, isocyanate group, epoxy group, carboxy group, or hydroxyl group independently at each of the terminals.

4. The waterborne resin crosslinking agent according to claim 1, wherein the alkylene glycol-based compound is one or more selected from the group consisting of an ethylene glycol-based compound and a propylene glycol-based compound.

5. The waterborne resin crosslinking agent according to claim 1, wherein the alkylene glycol-based compound is a compound represented by the following formula (1):

$$R^2(OCHR^1CH_2)_nOR^3 \tag{1}$$

wherein $R^1$ is a hydrogen atom or a methyl group; $R^2$ and $R^3$ are each independently a hydrogen atom, a hydrocarbon group having 1 to 18 carbon atoms, or an acyl group having 2 to 18 carbon atoms; and n is an integer of 1 to 70.

6. The waterborne resin crosslinking agent according to claim 5, wherein in the formula (1), $R^2$ and $R^3$ are each independently a hydrogen atom or an alkyl group having 1 to 3 carbon atoms.

7. The waterborne resin crosslinking agent according to claim 1, wherein the water-soluble polymer is one or more selected from the group consisting of polyvinylpyrrolidone, polyvinyl alcohol, polyethyleneimine, polyacrylic acid, polyacrylamide, carboxymethylcellulose, starch, and gelatin.

8. The waterborne resin crosslinking agent according to claim 1, wherein the surfactant is one or more selected from the group consisting of alkylbenzene sulfonate, benzalkonium chloride, and polyoxyethylene sorbitol tetraoleate.

9. A waterborne resin crosslinking agent-containing liquid comprising the waterborne resin crosslinking agent according to claim 1 and an aqueous medium.

10. The waterborne resin crosslinking agent-containing liquid according to claim 9, wherein the aqueous medium is water or a mixed solvent of water and a hydrophilic solvent.

11. A waterborne resin composition comprising the waterborne resin crosslinking agent according to claim 1 and a waterborne resin.

12. The waterborne resin composition according to claim 11, wherein the waterborne resin has a group selected from the group consisting of a carboxy group, an amino group, and a hydroxyl group.

13. The waterborne resin composition according to claim 11, wherein the waterborne resin is one or more selected from the group consisting of a polyester resin, an acrylic resin, a polyurethane resin, an epoxy resin, a styrene-acrylic resin, a melamine resin, a polyolefin resin, and a fluororesin.

14. The waterborne resin composition according to claim 11, wherein the waterborne resin composition is an adhesive, a fiber treatment agent, a coating agent, or a paint.

15. The waterborne resin composition according to claim 14, wherein the paint is a wet-on-wet coating paint.

16. A resin film formed from the waterborne resin composition according to claim 11.

17. An article obtained by forming the resin film according to claim 16 on a base material.

* * * * *